Dec. 2, 1969     V. R. DE CSIPKES     3,481,156

POWER TRANSMISSION ASSEMBLY

Filed March 29, 1968

INVENTOR.
Victor R. de Csipkes
BY Edward A. Sage
ATTORNEY.

United States Patent Office 3,481,156
Patented Dec. 2, 1969

3,481,156
POWER TRANSMISSION ASSEMBLY
Victor R. deCsipkes, Great Kills, N.Y., assignor to Pennsalt Chemicals Corporation, Philadelphia, Pa., a corporation of Pennsylvania
Filed Mar. 29, 1968, Ser. No. 717,315
Int. Cl. F16c 1/08
U.S. Cl. 64—2     16 Claims

ABSTRACT OF THE DISCLOSURE

A flexible shaft is provided with a squared end to serve as a driving connection, the cross-corner dimension thereof exceeding the shaft diameter. Radial clearance between the shaft and its sheath or casing may be minimized by providing the inner surface of the casing with longitudinal grooves. The grooves permit assembly of the apparatus by insertion of the shaft into the casing so that the corners of the squared end pass through the casing via the grooves.

---

This invention relates to power transmission asssemblies and especially to sheathed flexible shafts, such as speedometer cables.

Flexible shafting has long been in use for transmitting power with a rotary motion. Conventionally, a squared end or other non-circular from of driving surface is employed to provide a convenient means of establishing a driving connection with each of the driving and driven elements which the shaft is adapted to connect. The terminal tips of the shaft are usually squared by swaging, a forming method which also binds the ends by interengagement of the several coiled strands. In addition, the tips may be fused or soldered to hold the inter-engaged strand ends still more securely, and the shaft is cut to length by an electric arc or any other suitable cutting means.

Heretofore, casings have had a uniform inside diameter which exceeds not only the shaft diameter, but also the cross-corner dimension of the squared end. This permits passage through the casing of the squared end during assembly, but it is believed that excessive radial clearance between the shaft and the casing has been the cause of high operating noise.

In accordance with the present invention, the inner surface of the casing is provided with longitudinal grooves having sufficient depth to accommodate the radially projecting corners of the squared end which pass therethrough during assembly. The longitudinal grooves in the inner surface of the casing define longitudinal ribs therebetween, and these ribs project radially inwardly into close sliding clearance with the shaft. Such an arrangement not only protects the shaft and surrounding objects, but it also minimizes the operational noise level which previously may have been due to the shaft rotating while loosely fitting the casing. Although not entirely understood, a very large reduction in noise level was unexpectedly achieved. For example, a 24 decibel reduction in noise level was achieved in one experimental application of the invention.

The various objects, features and advantages of the invention will appear more fully from the detailed description which follows, taken in connection with the accompanying drawings, in which.

Figure 1:
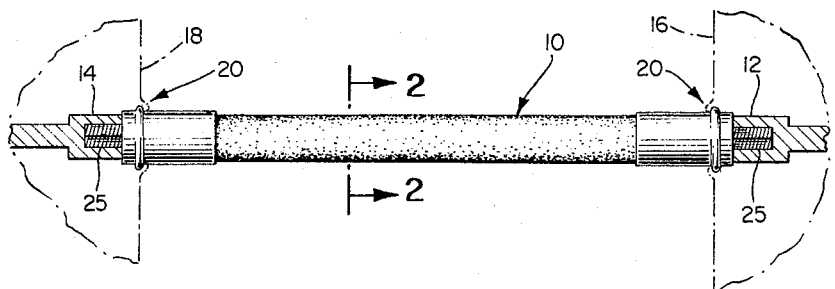
FIG. 1 is an elevational view of a power transmission assembly constructed according to the invention and connected between a driven element and a driving element, both of the latter being shown in phantom.

Referring to the drawings, there is shown in FIG. 1 a power transmission assembly 10 connected between a driving element 12 and a driven element 14. It is to be noted that each of the elements 12 and 14 is mounted for rotation within a housing of apparatuses shown in phantom and designated respectively by the numerals 16 and 18. Suitable annular interlocking formations or their equivalent, designated generally by the numeral 20, are provided at each end of the assembly 10 in order to secure the ends of the power transmission assembly 10 in position relative to their associated apparatuses 16 and 18. Apparatus 16 can represent an automotive transmission; and apparatus 18 can represent a speedometer.

Figure 2:
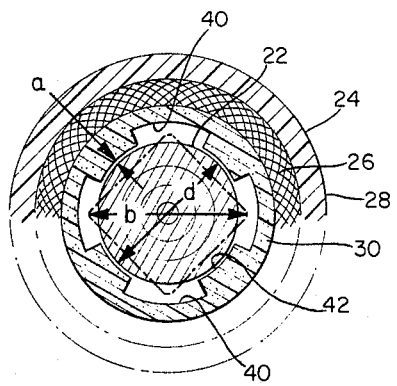
FIG. 2 is a transverse sectional view, taken along the line 2—2 of FIG. 1 and showing the construction of the invention on an enlarged scale, with the cross-sectional configuration of the squared end being superimposed in phantom thereon.

Referring additionally to FIG. 2, the assembly 10 comprises a flexible shaft 22 sheathed by a multi-layer, tubular casing 24 for rotation therein while transmitting power or rotary motion, through squared ends between the driving and driven elements 12 and 14. Each squared end 25 has a cross-corner dimension $b$, taken transverse to the longitudinal or rotational axis of the shaft 22.

The casing 24 is of multi-layer tubular construction, with an intermediate layer 26 of braided wire disposed between a vinyl outer layer or cover 28 and an inner layer 30 of plastic material. Stranded wire can be substituted for the braided wire in the intermediate layer 26. Layer 30 is suitably of nylon material, but excellent results are obtained with layer 30 made of graphite-impregnated nylon material. The radial clearance between the intermediate portion of the shaft 22, with circular cross section, and the adjacent inner layer 30 of the surrounding casing 24 is designated by the latter $a$. Optionally, the tubular casing 24 can be made wholly of plastic material such as nylon or graphite-impregnated nylon.

Figure 4:
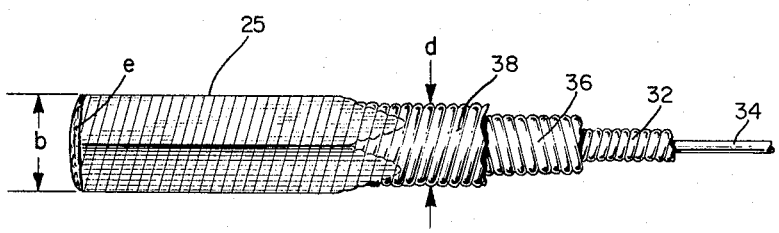
FIG. 4 is a fragmentary elevational view of a flexible shaft employed in the assembly, also on an enlarged scale, with portions broken away to show construction details.

In order to fully appreciate the present invention, it should be understood that flexible shafting 22, as shown in FIG. 4, comprises a plurality of coils of closely wound wire, the first layer 32 being wound on a straight wire core mandrel or spine 34; and then second and third layers, 36 and 38, respectively, (and any additional layers) are coiled on one another in alternately opposite directions to an outside diameter $d$. With this construction, continuous or long lengths of shafting may be fabricated, from which cut lengths for commercial purposes may be severed. In this connection, reference is made to expired U.S. Patent No. 1,649,310, which issued Nov. 15, 1927 in the name of Emmet A. Joline. As mentioned therein the body of the shaft 22 is swaged at predetermined distances apart to provide compressed regions in which the wire strands are mashed or crushed so compactly as to distort and interlock them after which the shaft may be severed midway along the length of the compressed region, thus dividing such region into a trailing end portion of one shaft and the beginning end portion of another.

More recently, there is less compacting of the strands and reliance on fusing the severed ends 25 of the shaft to cause them to cling together and remain inert, as at $e$. It has been found that an electric arc can perform the fusing step simultaneously with cutting the shaft to length. Therefore, square forming as now praciced may involve squeezing the end 25 between opposed jaws a first time, then rotating the shaft 90°, and squeezing a second time inwardly on the material squeezed outwardly by the first squeeze, so that there is produced an end portion 25 of square from having a cross-corner dimension *b* exceeding the diameter *d* of the unswaged or uncompressed portion of the shaft 22.

Reference will now be made to the prior art construction shown in FIG. 3, with primed numerals and letters designating parts correspondingly similar to the construction embodying the invention disclosed herein with reference to FIG. 2. It will be noted in FIG. 3 that between the flexible shaft 22' and the casing 24' there is a large radial clearance *a'*. It will also be noted that the cross-sectional configuration of the square end 25' is shown in phantom lines superimposed on the solid lines representing the flexible shaft 22. Because of the large cross-corner dimension *b'*, it can be seen that the inside diameter of the casing 24' must be large enough to accommodate the squared end 26' when it passes therethrough during assembly.

Figure 3:
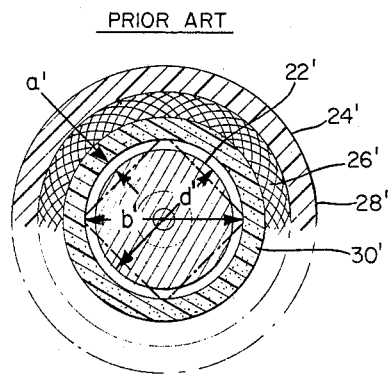
FIG. 3 is a view similar to FIG. 2, but showing the prior art construction.

From the foregoing it will be appreciated that the excessive radial clearance *a'* in the construction of FIG. 3 has developed from current procedures for square end forming and cutting the shafts to length; and that the present invention is directed to eliminating such excessive radial clearance *a'*, while reducing operating noise levels as an additional advantage.

To this end, the casing 24, and particularly the inner layer 30, is provided with a plurality of longitudinally extending grooves 40 running the entire length of the casing from one end to the other. As shown, there are as many grooves 40 in the casing 24 as there are corners or portions of the non-circular driving surfaces disposed a greater distance from the axis of the shaft 22 than the surface of the intermediate shaft portion, the latter being of circular cross section. It is possible, however, to have surplus grooves 40. For example, with an end portion 25 having four corners as shown it is also possible to have an effective arrangement with eight equally spaced grooves 40, so long as the corners register with the grooves. Likewise, an end portion 25 of triangular cross section may be fitted to-a-casing having 3, 6, or 9 grooves, or some other numbered derived by multiplying the number of super-extending corners by an integer.

The invention is applicable wherever the cross-corner dimension *b* exceeds the shaft diameter *d* by an appreciable amount, even of the order of .005 inch and upwards. As thus arranged the grooves 40 define as many longitudinal shaft-contacting ribs 42 in the inner surface of the casing 24 with a sliding radial clearance of, say .002 inch between them.

The arrangement permits longitudinal passage of the corners of the shaft end 25 through the grooves 40 of the casing until said end 25 protrudes from the end of the casing 24, while the ribs 42 engage the outer surface of the shaft 22 and prevent it from rattling around too loosely within the casing. A snugly fitting sheath is therefore partly the reason for the lower operating noise levels, with reductions as much as 24 decibels in some experimental applications. The noise reduction is an extra or incidental benefit, but the extent of noise reduction is so appreciable as to be unexpected, and hence it is not entirely understood. Accordingly it is also theorized that by reducing the area of frictional surfaces in engagement a contribution to noise abatement or attenuation is obtained.

Modifications

In describing the invention as having "longitudinal or longitudinally extending" ribs and grooves, it is to be understood that the quoted terms include not only axially extending ribs 42 and/or grooves 40 but also ribs and/or grooves that are disposed in spiral formation about the longitudinal axis of the assembly, as if rifled.

The invention can be practiced by making a driving end 25 of triangular and other polygonal-shaped, cross-sectional configuration in addition to the square cross-sectional shape described above.

Additionally, the casing 10 may be made wholly or partly of other plastic materials, such as Teflon, polyethylene, Delrin, and the like, etc. without departing from the inventive concept. It is to be noted that the broad concept of the invention is intended to cover constructions wherein the minor transverse dimension of the grooved inner surface of the casing 10, taken diametrically across opposed ribs 42, is greater than the cross-corner dimension *b* of the end 25 of the shaft 22. This is to take advantage of the quiet operation afforded by such casing construction in applications where the shaft end 25 and the inwardly extending ribs 42 are not in radially overlapping relationship during assembly.

A still further feature of the present invention is that it lends itself well to lubrication by lubricants carried in the grooves 40. It is contemplated that a lubricant suitable for this application will be a compound of oil (usually 92 to 98% by weight) held in a polymer matrix. Such lubricating compound has the consistency of grease and feeds oil at a control rate to the surfaces of the assembly in bearing contact. It is usable over a wide temperature range. Lubricating compounds of this type supply continuously metered lubrication to contacting surfaces from an adjacent chamber without the use of wicks or impregnated fibers, but with the same effect as if wicks and the like were employed. An assembly thus lubricated operates with less friction resistance during rotation of the shaft, and it is also believed to operate even more quietly than without such lubrication. Lubricants of the type set forth are commercially available as "Poly-Oil" from The Polymer Corp., also as "Nylube" from the Synco Co., and as "Beacon 325 Grease" from the Esso Corporation.

What is claimed is:

1. In a power transmission assembly, the combination of:
   (a) an elongated flexible shaft of generally circular cross section intermediate the end portions thereof,
   (b) a tubular casing sheathing at least said intermediate portion of the shaft and within which casing said shaft is rotatable for transmitting mechanical power between said end portions,
   (c) at least one end portion of said shaft being formed to have a non-circular surface adapted for making a driving connection, the maximum dimension of said one end portion transverse to said axis being at least equal to that of said intermediate shaft portion, and
   (d) said casing being provided on its inner surface with a plurality of grooves extending in substantially longitudinal direction and defining shaft-connecting ribs therebetween.

2. The combination according to claim 1 wherein said end portion of said shaft is of generally square cross section with a cross-corner dimension exceeding the shaft diameter of the intermediate portion thereof.

3. The combination according to claim 1, further including a driving element connected to one of said end portions and a driven element connected to the other of said end portions.

4. The combination according to claim 3 wherein said driven element is a speedometer having a socket adapted to receive said other end portion.

5. The combination according to claim 1 wherein said flexible shaft comprises one or more coils of closely wound wire.

6. The combination according to claim 5 wherein a plurality of said coils are wound one on the other in alternately opposite directions.

7. The combination according to claim 1 wherein said ribs and said shaft have sliding clearance between them.

8. The combination according to claim 1 wherein said casing is of multilayer tubular construction, with a layer made from wire strands being disposed between the inner and outer layers of plastic material.

9. The combination according to claim 1 wherein said casing is of tubular construction, with the inner portion thereof being made of graphite-impregnated nylon material.

10. The combination according to claim 1 wherein said end portions protrude from said casing.

11. The combination according to claim 1 wherein said ribs are in radially overlapping relationship with the portions of said driving surface disposed a greater transverse distance from said axis than the surface of the intermediate shaft portion.

12. In a power transmission assembly, the combination of:
(a) an elongated flexible shaft of generally circular cross section intermediate the end portions thereof,
(b) a tubular casing sheathing at least said intermediate portion of the shaft and within which casing said shaft is rotatable for transmitting mechanical power between said end portions,
(c) at lest one end portion of said shaft being formed to have a non-circular surface adapted for making a driving connection, the maximum dimension of said one end portion transverse to said axis exceeding by an appreciable amount that of said intermediate shaft portion, and
(d) said casing being provided on its inner surface with a plurality of longitudinal grooves defining shaft-contacting longitudinal ribs therebetween.

13. The combination according to claim 12 wherein said ribs and said grooves are spirally formed about said axis.

14. The combination according to claim 12 wherein said grooves contain a lubricant.

15. The combination according to claim 14 wherein said lubricant is a compound consisting primarily of oil in a polymer matrix.

16. The combination according to claim 12 wherein the minimum transverse dimension of said casing exceeds the maximum transverse dimension of said shaft at its driving end portion.

References Cited

UNITED STATES PATENTS

| | | | |
|---|---|---|---|
| 1,421,623 | 7/1922 | Veeder | 64—2 |
| 1,871,528 | 8/1932 | Joline | 64—2 |
| 3,240,233 | 3/1966 | Johnston | 74—501 X |
| 3,242,691 | 3/1966 | Robinson et al. | 64—3 |

FOREIGN PATENTS 1,294,854   4/1962   France.

HALL C. COE, Primary Examiner

U.S. Cl. X.R.

138—125